US008319122B2

(12) United States Patent
Kishikawa et al.

(10) Patent No.: US 8,319,122 B2
(45) Date of Patent: Nov. 27, 2012

(54) HOPPER FOR A COMBINATION WEIGHING APPARATUS WITH ASYMMETRIC BOTTOM GATES

(75) Inventors: Mikio Kishikawa, Shiga (JP); Toshikazu Shotsu, Shiga (JP); Toshiharu Kageyama, Shiga (JP); Teruo Hayakawa, Shiga (JP); Yuta Yoneda, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 811 days.

(21) Appl. No.: 12/522,110

(22) PCT Filed: Mar. 3, 2008

(86) PCT No.: PCT/JP2008/053754
§ 371 (c)(1),
(2), (4) Date: Jul. 2, 2009

(87) PCT Pub. No.: WO2008/108329
PCT Pub. Date: Sep. 12, 2008

(65) Prior Publication Data
US 2010/0044116 A1  Feb. 25, 2010

(30) Foreign Application Priority Data
Mar. 2, 2007 (JP) .................................. 2007-052607

(51) Int. Cl.
*G01G 19/387* (2006.01)
*G01G 13/18* (2006.01)
*B65B 37/18* (2006.01)
*B65D 90/62* (2006.01)

(52) U.S. Cl. ....... 177/25.18; 177/59; 177/105; 198/530; 198/532

(58) Field of Classification Search ............... 177/25.18, 177/105, 108, 59; 198/530–532
See application file for complete search history.

(56) References Cited

U.S. PATENT DOCUMENTS 2,632,589 A    3/1953  Rowland
4,489,862 A *  12/1984  Diem ........................... 222/263
4,848,534 A *  7/1989  Sandwall ...................... 198/535
(Continued)

FOREIGN PATENT DOCUMENTS
JP           4-102292 U      9/1992
(Continued)

OTHER PUBLICATIONS
Extended European Search Report dated Nov. 18, 2010 for the counterpart European Patent Application No. 08721174.4.

*Primary Examiner* — Randy W Gibson
(74) *Attorney, Agent, or Firm* — Global IP Counselors, LLP

(57) ABSTRACT

A hopper is provided with which damages of articles can be suppressed without lowering the processing speed. A hopper (4) includes a first hopper main body (40), and a first gate (G1). A first inner surface (41) of the first gate (G1) forms a collecting space (A1) for holding articles with the first hopper main body (40), and stores articles in the interior of the collecting space (A1) when in the closed state and discharges articles by turning to open. The first inner surface (41) includes a first upper slanted surface (S2) and a first lower slanted surface (S3) that are continuous. An angle formed by the first lower slanted surface (S3) and the horizontal plane is smaller than an angle formed by the first upper slanted surface (S2) and the horizontal plane.

16 Claims, 12 Drawing Sheets

U.S. PATENT DOCUMENTS

| | | | |
|---|---|---|---|
| 4,874,048 A * | 10/1989 | Kawanishi et al. | 177/25.18 |
| 4,901,807 A * | 2/1990 | Muskat et al. | 177/25.18 |
| 5,160,220 A * | 11/1992 | Yoshida et al. | 405/236 |
| 5,277,533 A | 1/1994 | Caridis et al. | |
| 5,736,683 A | 4/1998 | Howard | |
| 5,959,258 A * | 9/1999 | Howard | 177/25.18 |
| 6,437,256 B1 | 8/2002 | Miyamoto | |
| 7,364,034 B1 * | 4/2008 | Clark et al. | 198/525 |
| 7,663,067 B2 * | 2/2010 | Hayakawa et al. | 177/25.18 |
| 7,712,629 B2 * | 5/2010 | Bruland | 177/25.18 |
| 7,855,343 B2 * | 12/2010 | Nakagawa et al. | 177/25.18 |

FOREIGN PATENT DOCUMENTS

| | | |
|---|---|---|
| JP | 5-11468 Y2 | 3/1993 |
| JP | 5-28236 Y2 | 7/1993 |
| JP | 2592769 Y2 | 1/1999 |
| JP | 2001-50803 A | 2/2001 |
| JP | 2004-093464 A | 3/2004 |
| JP | 2005-55203 A | 3/2005 |
| WO | WO-97/34131 A1 | 9/1997 |

* cited by examiner

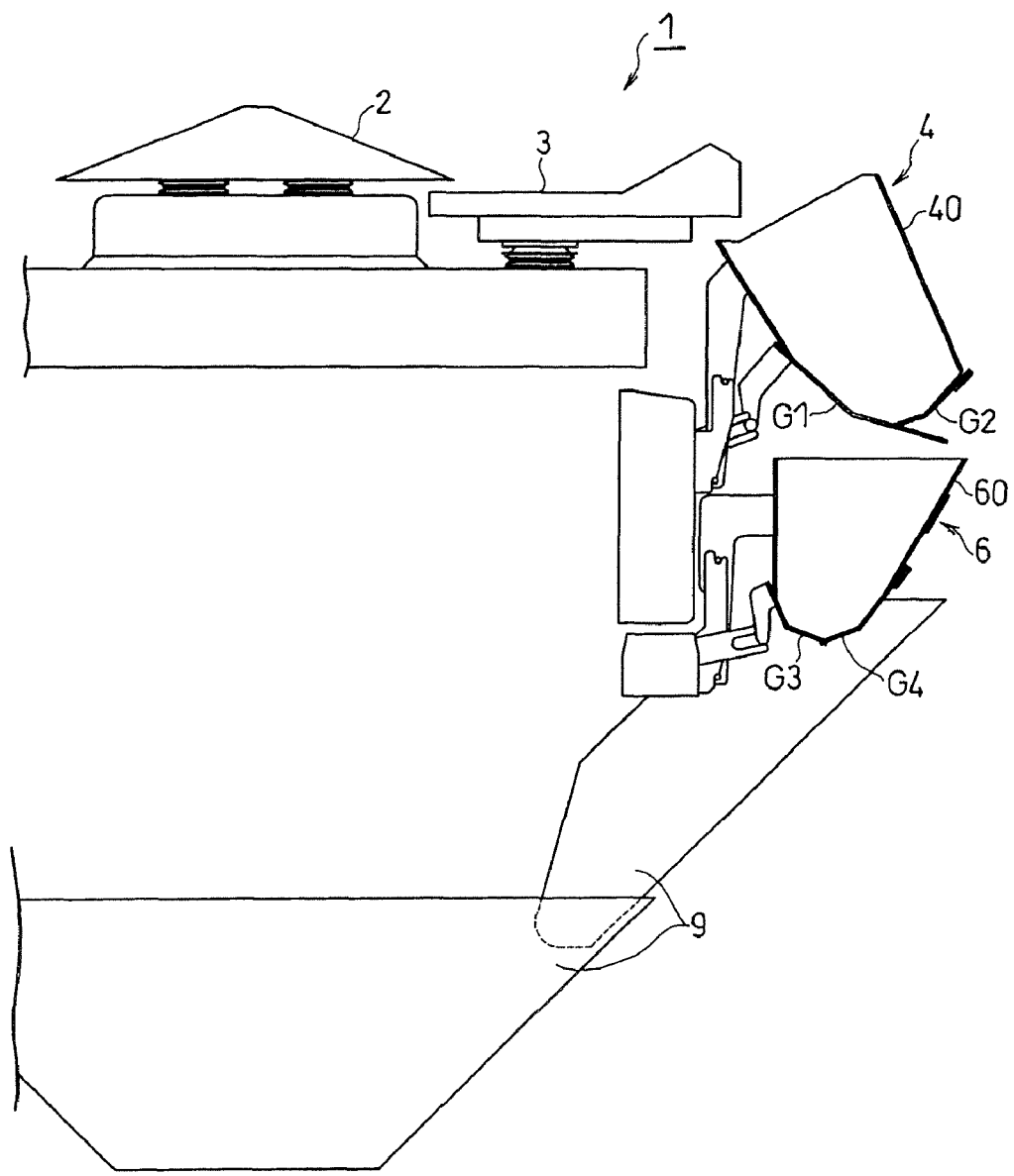
F I G. 1

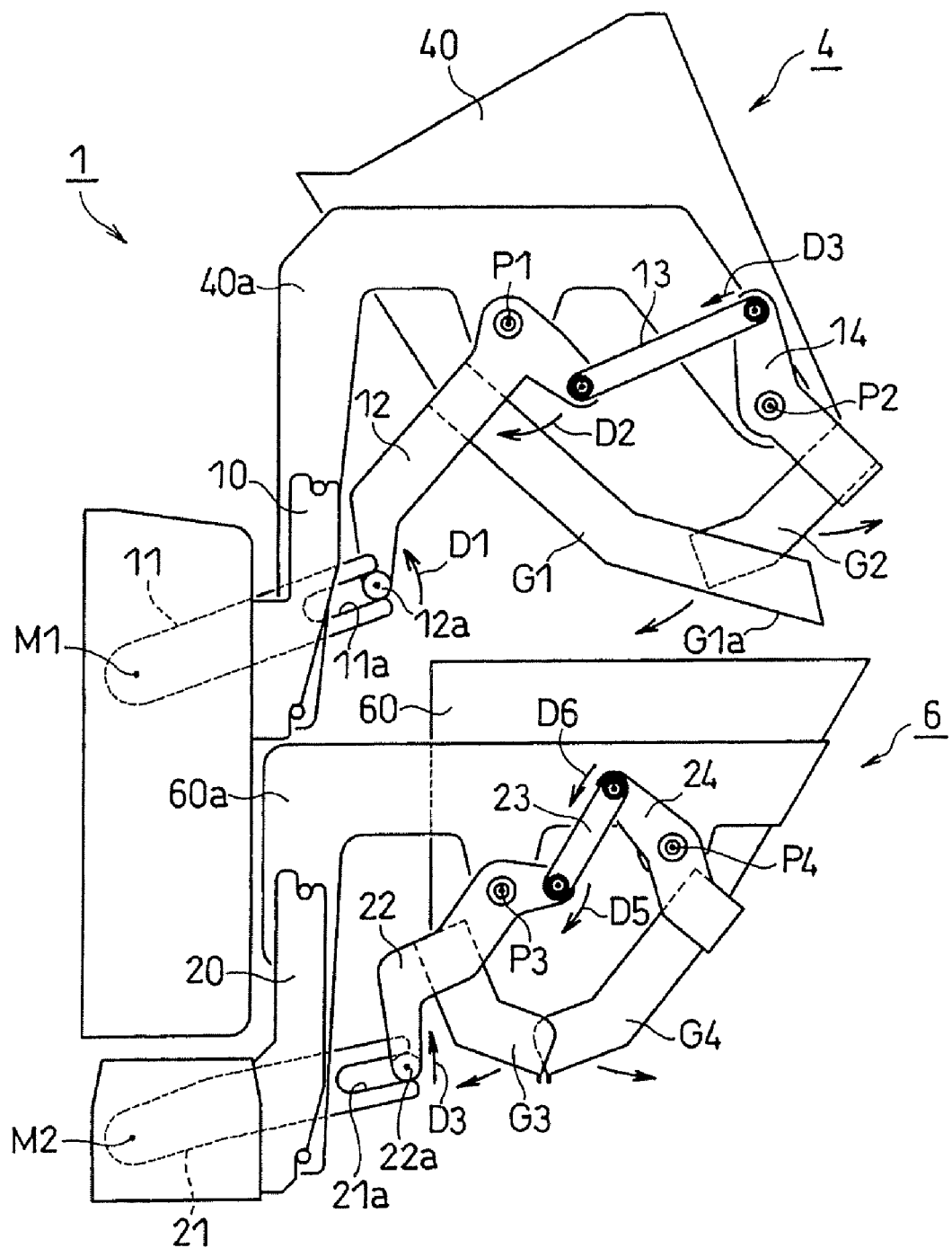
F I G. 2

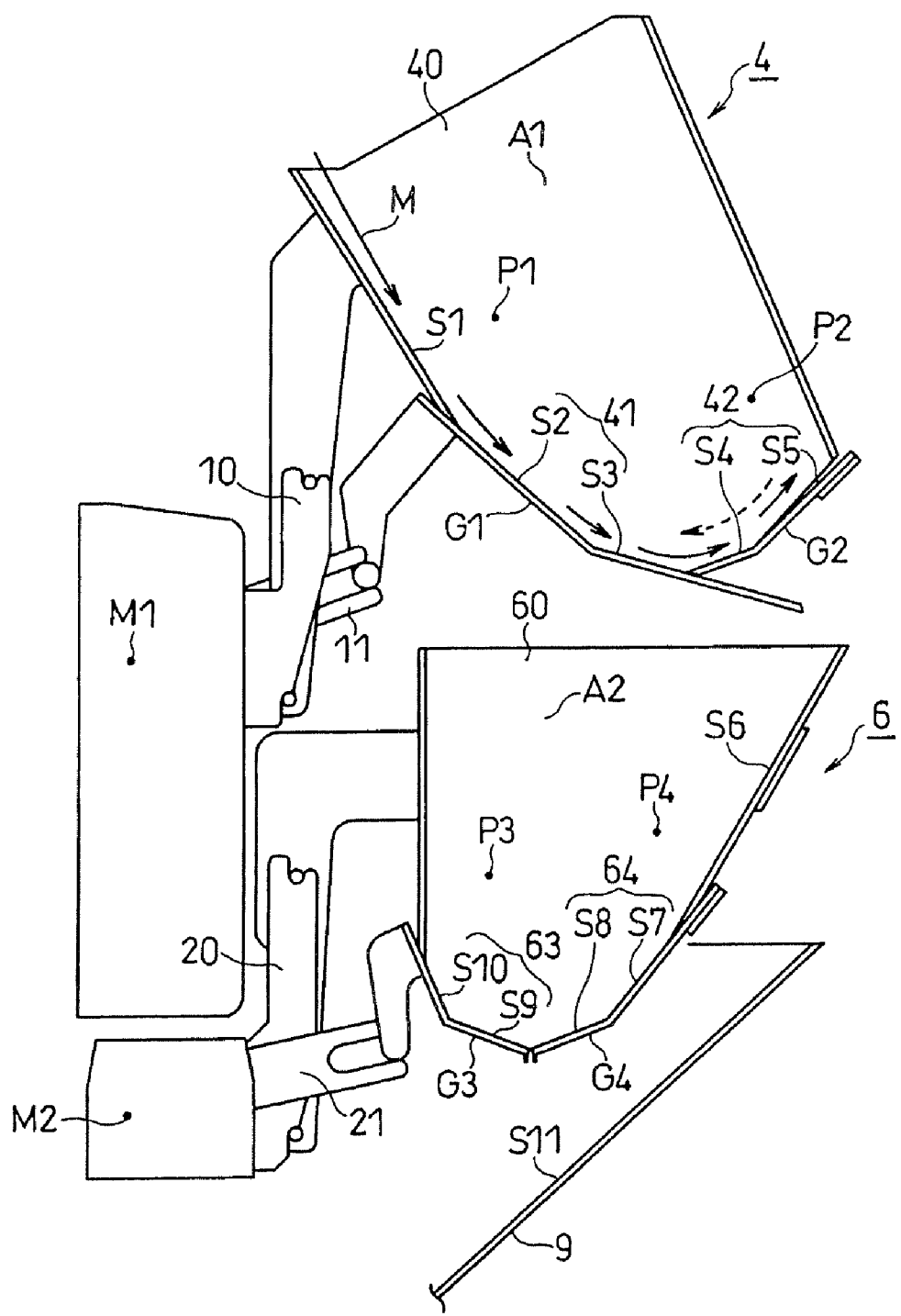
F I G. 4

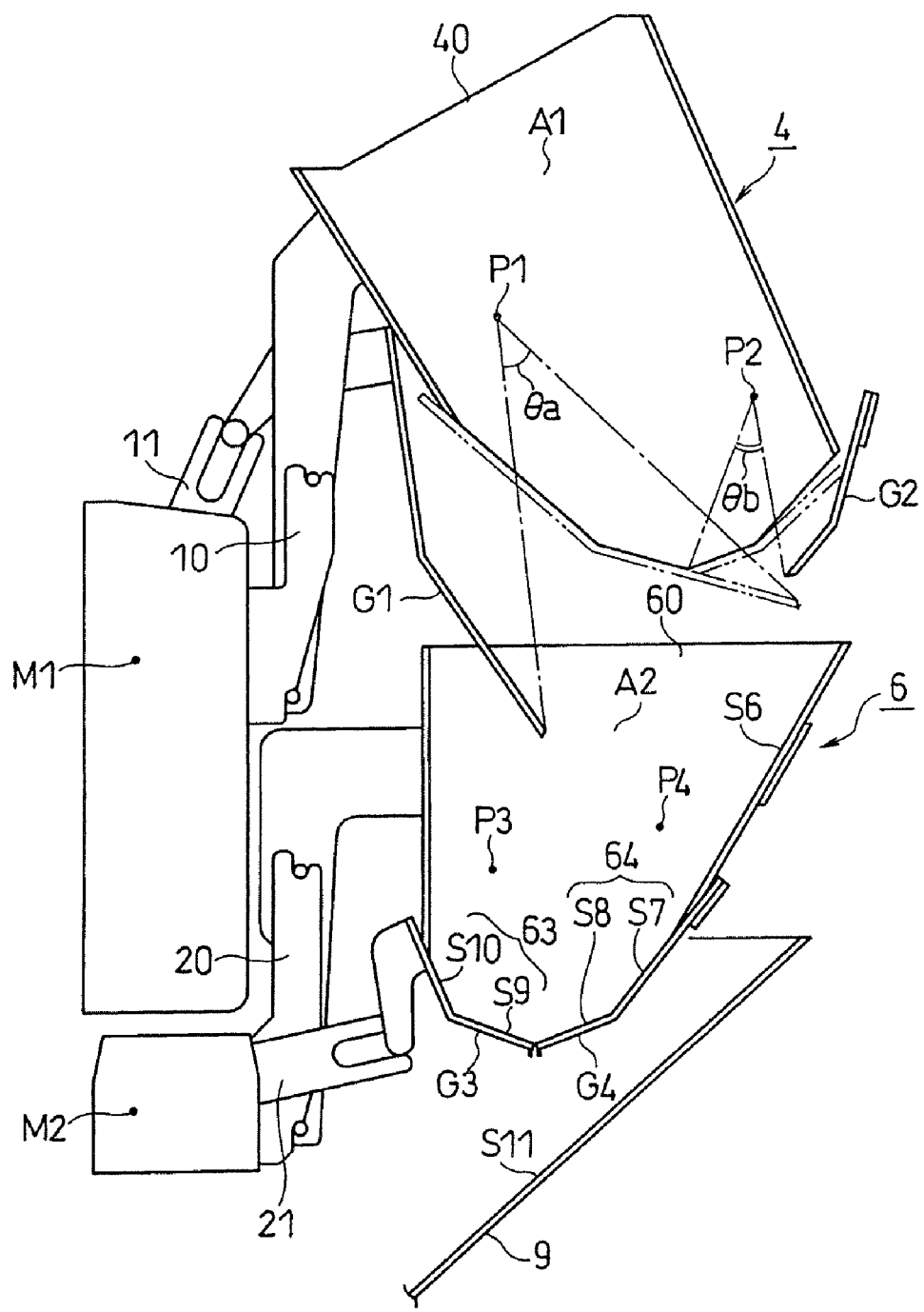
F I G. 6

HOPPER FOR A COMBINATION WEIGHING APPARATUS WITH ASYMMETRIC BOTTOM GATES

This application claims priority to Japanese Patent Application No. 2007-052607, filed on Mar. 2, 2007. The entire disclosure of Japanese Patent Application No. 2007-052607 is hereby incorporated herein by reference.

TECHNICAL FIELD

The present invention relates to a hopper, and in particular, a hopper of a combination weighing apparatus.

BACKGROUND ART

Conventionally, a combination weighing apparatus is used for combining articles with weights thereof measured so that the value of the combined weights is near or equal to a target value.

First, a weighing system for a conventional combination weighing apparatus will be described.

As shown in FIG. 9, a delivery conveyor 100 drops an article M to be weighed onto a distribution portion 2. Furthermore, after several or a multiple of articles M are collected, the articles M are put into a bag, and made into a product.

Supply troughs 3i each drop and provide the articles M on the distribution portion 2 to a plurality of pool hoppers 4i that are provided downstream of each of the supply troughs 3i. A gate 5i is provided on each of these pool hoppers 4i, and the articles M received, which are supplied from each of the supply troughs 3i, are temporarily stored and accumulated in these pool hoppers 4i. Weighing hoppers 6i are provided downstream of each of the pool hoppers 4i. Each of these weighing hoppers 6i is provided with a weighing head having a weight detector 7i for detecting the weight of articles M that are dropped into the weighing hopper 6i from the pool hopper 4i, and a gate 8i. A large collecting chute 9 is provided below the gates 8i, and the values of the weights of articles M detected at each of the weight detectors 7i are combined so that the weight of the articles M gathered together here has a value that is near or equal to a target value. The articles M are then dropped to a bag forming packaging machine (not shown) and the like on the downstream side.

In this manner, each of the hoppers is provided with articles that are dropped from above. Each hopper directly relates to the processing ability of the combination weighing apparatus, and there have been various proposals for the hoppers such as Japanese Unexamined Utility Model Publication No. 4-102292 (Abstract), Japanese Examined Utility Model Application Publication No. 5-11468 (FIG. 1), and Japanese Examined Utility Model Application Publication No. 5-28236 (FIGS. 2 and 5).

DISCLOSURE OF THE INVENTION

However, since the inner surface, on which articles are temporarily accumulated, of the hoppers in Japanese Unexamined Utility Model Publication No. 4-102292 or Japanese Examined Utility Model Application Publication No. 5-11468, is formed linearly and V-shaped, after articles are dropped from above and slip downwardly along the inner surface thereof, the articles may hit the V-shaped inner surface, and as a result of this, the articles may be damaged.

Meanwhile, with the hopper in Japanese Examined Utility Model Application Publication No. 5-28236, even though the bottom of the gate is formed to be semicircular (arcuate) and articles slip downwardly on the gate, the articles may be damaged since the articles hit a base wall that is arranged substantially vertically between the gates.

One object of the present invention is to provide a hopper that will not slow down the processing speed, and is able to prevent articles from being damaged.

The hopper in accordance with the present invention is adapted to be used in a weighing apparatus. The hopper includes a first hopper main body, and a first gate. The first hopper main body has a tubular shape, and configured and arranged to be mounted to the weighing apparatus. The first gate is operatively coupled to the first hopper main body. The first gate has a first inner surface forming a collecting space with the first hopper main body so as to hold articles. The first gate is configured and arranged to be selectively open and close to store the articles inside the collecting space when in the closed state, and to discharge the articles when in the opened state. The first inner surface includes a first upper slanted surface and a first lower slanted surface that are continuous. An angle formed by the first lower slanted surface and the horizontal plane is smaller than an angle formed by the first upper slanted surface and the horizontal plane when the first hopper main body is mounted to the weighing apparatus.

According to the first aspect, articles glided downwardly on the first inner surface can be prevented from being damaged because the first upper slanted surface and the first lower slanted surface are sloped at the angles as described above.

The hopper preferably further includes a second gate operatively coupled to the first hopper main body. By having a second inner surface of the second gate be slanted relative to a vertical plane, the articles glided downwardly on the first inner surface glide inclining upward along the second inner surface, and thus, the moving speed of the articles gradually decreases. Therefore, it is possible to prevent the articles from being damaged.

In addition, by having a slanted surface on the bottom of the first hopper main body, articles glided downwardly on the first inner surface glide inclining upward on the slanted surface of the first hopper main body, and thus, the moving speed of the articles gradually decreases. Therefore, it is possible to prevent the articles from being damaged.

Furthermore, in the case that a second gate is arranged, it is preferable that the second inner surface of the second gate includes a second upper slanted surface and a second lower slanted surface that are continuous. Moreover, it is preferable that an angle formed by the second lower slanted surface and the horizontal plane is smaller than an angle formed by the second upper slanted surface and the horizontal plane when the first hopper main body is mounted to the weighing apparatus.

In addition, it is preferable that the first inner surface is longer than the second inner surface when viewed from a direction along the turning axes of the first gate and the second gate. When the first gate and the second gate are in the closed state, a lower end of the second gate is in contact with or disposed adjacent to the first inner surface. According to this embodiment, a protrusion of the first inner surface of the first gate that protrudes out more than the contacting point or the proximal point of the first inner surface and the lower end of the second gate functions as a slide, and thereby the freely falling distance of the articles to a member below becomes short. Therefore, it is possible to further suppress damages to the articles.

In the case that the second gate is arranged, it is preferable that the rotational angle of the first gate when the first gate opens is set to be greater than the rotational angle of the second gate when the second gate opens.

If the second gate is not arranged and a slanted surface is arranged at the bottom of the first hopper main body, it is preferable that the first hopper main body also turns when the first gate turns to open to accelerate the discharge of the articles. The control of the turning of the first gate and the first hopper main body can be performed by a control unit including a CPU and a memory.

Furthermore, according to another aspect of the present invention, a hopper unit includes the hopper described above as a first hopper and a second hopper positioned below the first hopper. The second hopper has a second hopper main body having a tubular shape, and configured and arranged to be mounted to the weighing apparatus. The second hopper includes a third gate having a third inner surface, and a fourth gate having a fourth inner surface. The discharge of the articles is performed with respect to the second hopper main body by opening the third gate and the fourth gate. The articles discharged and dropped from the first hopper hit an inner surface of the second hopper main body.

With this hopper unit, the third inner surface includes a third upper slanted surface and a third lower slanted surface that are continuous, and it is preferable that an angle formed by the third lower slanted surface and the horizontal plane is smaller than an angle formed by the third upper slanted surface and the horizontal plane when the second hopper main body is mounted to the weighing apparatus. Furthermore, the fourth inner surface includes a fourth upper slanted surface and a fourth lower slanted surface that are continuous, and it is preferable that an angle formed by the fourth lower slanted surface and the horizontal plane is smaller than an angle formed by the fourth upper slanted surface and the horizontal plane when the second hopper main body is mounted to the weighing apparatus.

In addition, according to another aspect of the present invention, a combination weighing apparatus includes a plurality of the hopper units described above, and a collecting chute of a funnel shape. The collecting chute is arranged below the plurality of hopper units, and collects articles discharged from the plurality of hopper units. Furthermore, the slanting angle of the fourth lower slanted surface of the fourth gate in the opened state relative to the horizontal plane and the slanting angle of the collecting chute relative to the horizontal plane are substantially the same.

According to the above described aspects of the present invention, an angle formed by the first lower slanted surface and the horizontal plane is smaller than an angle formed by the first upper slanted surface and the horizontal plane, and the moving speed of the articles gradually decreases, and so it is possible to prevent articles from being damaged. If a second gate is arranged, articles glided downwardly on the first inner surface glide inclining upward along the second inner surface, and it is possible to prevent articles from being damaged. In addition, if a slanted surface is arranged at the bottom of the first hopper main body, articles glided downwardly on the first inner surface glide inclining upward on the slanted surface of the first hopper main body that is opposite the first inner surface, and so the moving speed of the articles gradually decreases, and it is possible to prevent articles from being damaged.

BRIEF DESCRIPTION OF THE DRAWINGS

FIG. 1 is a schematic sectional view showing the area around a hopper unit in accordance with an embodiment of the present invention.

FIG. 2 is a schematic side view showing the hopper unit including a pool hopper and weighing hopper.

FIG. 4 is a schematic sectional view showing a method for retaining articles in the pool hopper.

FIG. 6 is a schematic sectional view showing the operation of the pool hopper.

BEST MODE FOR CARRYING OUT THE INVENTION

Figure 3:
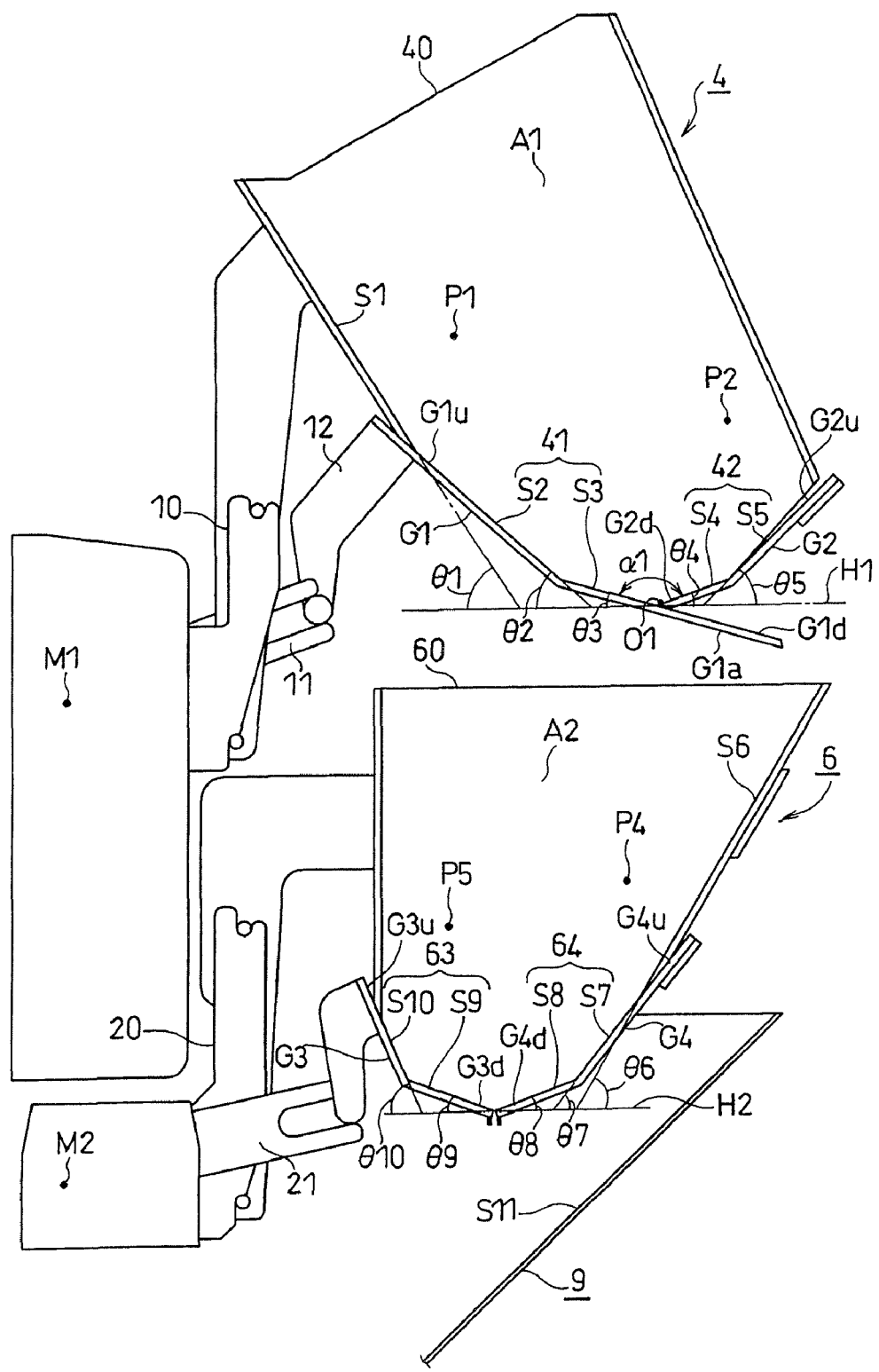
FIG. 3 is a schematic sectional view showing the hopper unit.

In the following description, as shown in FIG. 1, parts that are similar to those of a common combination weighing apparatus described above are given the same numerical symbols, and a set of supply trough 3, pool hopper 4, and weighing hopper 6 is illustrated as an example and described. In other words, a plurality (an N number) of each of the supply troughs 3, the pool hoppers 4, and the weighing hoppers 6 are provided, but only one set of them is being shown and described.

As shown in FIG. 1, a plurality of sets of the supply troughs 3, pool hoppers 4 (an example of a first hopper), and weighing hoppers 6 (an example of a second hopper) are provided downstream of a distribution portion 2, and a collecting chute 9 is provided downstream of the weighing hoppers 6.

As shown in FIG. 2, the pool hoppers 4 and the weighing hoppers 6 are provided on the main body of a combination weighing apparatus 1 through first and second brackets 10, 20, respectively.

Pool Hopper 4

The pool hopper 4 includes a first hopper main body 40, a first gate G1, and a second gate G2. The first hopper main body 40 is fixed to the main body of the combination weighing apparatus 1 through a first fixation portion 40a and the first bracket 10. As shown in FIGS. 2 and 3, the first hopper main body 40 has a tubular shape. As used herein, the "tubular shape" refers to a shape having an annular wall enclosing a hollow center space. The annular wall can be formed by a curved surface or surfaces, a planar surface or surfaces, or a combination thereof.

The pool hopper 4 temporarily retains articles by having both the first and the second gates G1, G2 closed. The two first and the second gates G1, G2 are bi-parting hoppers for discharging the articles by both of them turning to open.

First and Second Gates G1, G2

The first gate G1 and the second gate G2 are driven to open and close by a driving device not shown, through a link mechanism, which is described below.

Opening-Closing Mechanism of First Gate G1

A first driving arm 11 is arranged on the main body of the combination weighing apparatus 1. The first driving arm 11 is driven by the driving device to turn with a first driving center M1 as the center thereof. A slide groove 11a is formed on an end portion of the first driving arm 11, and a slider 12a formed on an end portion of a first link 12 is provided slidably in the slide groove 11a. The first link 12 is provided rotatably with a first pivot point P1 as the center thereof, and an upper end portion of the first gate G1 is fixed to the first link 12.

Figure 5:
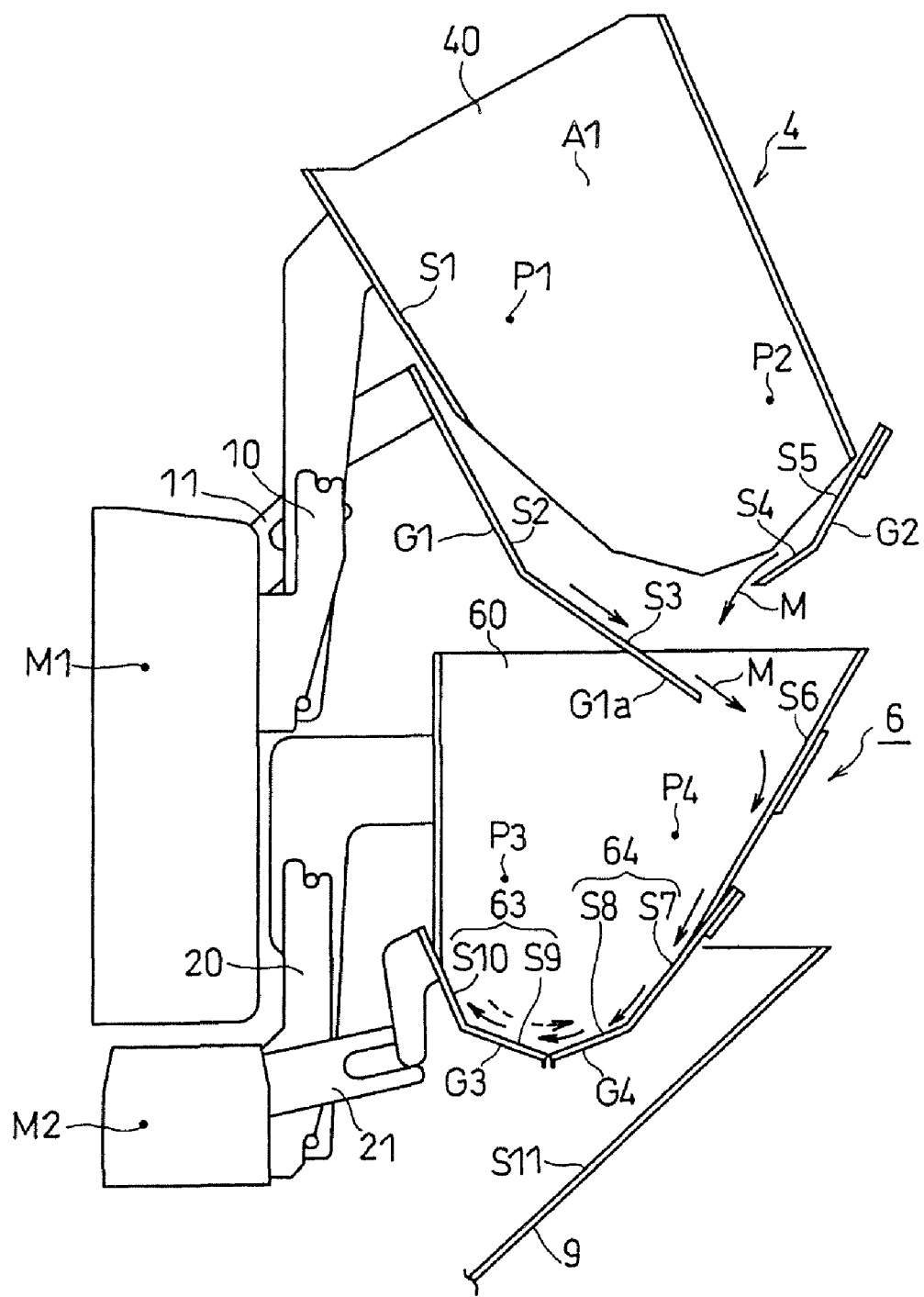
FIG. 5 is a schematic sectional view showing the operation of the pool hopper.

If the first driving arm 11 turns in a direction shown by arrow D1 with the first driving center M1 as the center thereof from the closed state in FIG. 2, the first link 12 turns in the arrow D2 direction with the first pivot point P1 as the center thereof, and the first gate G1 fixed to the first link 12 opens as shown in FIGS. 5 and 6.

Opening-Closing Mechanism of Second Gate G2

An end portion of a second link 14 is connected to the other end portion of the first link 12 shown in FIG. 2, through a first connecting link 13. The second link 14 is arranged to be able to turn with a second pivot point P2 as the center thereof, and the second gate G2 is fixed to the other end portion of the second link 14.

Therefore, if the first link 12 turns, with the first pivot point P1 as the center thereof, from the closed state shown in FIG. 2, the first gate G1 opens, and also, through the first connecting link 13, the second link 14 turns in the arrow D3 direction with the second pivot point P2 as the center thereof, and the second gate G2 opens as shown in FIGS. 5 and 6.

First Collecting Space A1 (FIG. 3)

In the closed state shown in FIG. 3, a first collecting space A1 for holding the articles is formed in the interior of the pool hopper 4. The first gate G1 and the second gate G2 include first and second inner surfaces 41, 42 that face the first collecting space A1.

A protrusion G1a that extends out more downwardly than the bottom end of the second gate G2 in the closed state is formed on the first gate G1. In other words, the first gate G1 has a slanted surface that is longer than the second gate G2 when viewed from a direction along turning axes (P1 and P2) of the first gate and the second gate as shown in FIG. 3.

The angle formed by a first slanted surface S1 on the side of the supply trough 3 (refer to FIG. 1) of the first hopper main body 40 and a horizontal plane H1 is set to be the first slanting angle $\theta 1$.

In the closed state shown in FIG. 3, the first inner surface 41 is formed to be bent, and the first inner surface 41 of the first gate G1 is formed so that the angle, third slanting angle $\theta 3$, that is formed by a third slanted surface S3 (first lower slanted surface) that includes a lower end portion G1d and the horizontal plane H1 is smaller than a second slanting angle $\theta 2$ of a second slanted surface S2 (first upper slanted surface) that includes an upper end portion G1u. Meanwhile, the second slanting angle $\theta 2$ is set to be smaller than the first slanting angle $\theta 1$.

Therefore, the first slanted surface S1, second slanted surface S2, and third slanted surface S3 that face the first collecting space A1 on the first gate G1 side are set so that the slanting angles $\theta 1$, $\theta 2$, $\theta 3$, in this order, become smaller relative to the horizontal plane H1.

Meanwhile, the second inner surface 42 is formed to be bent, and the second inner surface 42 of the second gate G2 is formed so that a fifth slanting angle $\theta 5$ formed by a fifth slanted surface S5 (second upper slanted surface) that includes an upper end portion G2u and the horizontal plane H1 is greater than a fourth slanting angle $\theta 4$ of a fourth slanted surface S4 (second lower slanted surface) that includes a lower end portion G2d.

Therefore, the fourth slanted surface S4 and the fifth slanted surface S5 of the second gate G2 are set so that the slanting angles $\theta 4$ and $\theta 5$, in this order, become bigger relative to the horizontal plane H1.

Consequently, articles glide down along the first slanted surface S1, the first inner surface 41, and the second inner surface 42 of the first hopper main body 40 that are formed to be roughly in a U-shape. At the intersecting point O1 at which the first gate G1 and the second gate G2 comes near each other or in contact with each other, an intersection angle $\alpha 1$ formed by the two gates G1 and G2 is large. This intersection angle $\alpha 1$, as shown in FIG. 3, is an obtuse angle that is closer to 180° than 90° (i.e., an obtuse angle greater than 135°). In this embodiment, the intersection angle $\alpha 1$ is set to about 140°. In addition, the angle formed by the first slanted surface S1 and the first inner surface 41, the angle formed by the second slanted surface S2 and third slanted surface S3 of the first inner surface 41, and the angle formed by the fourth slanted surface S4 and the fifth slanted surface S5 of the second inner surface 42 are also obtuse angles that are closer to 180° than 90° (i.e., an obtuse angle greater than 135°).

Movement of Articles within Pool Hopper 4

As shown by the arrows in FIG. 4, an article M that is supplied and dropped from the supply trough 3 (refer to FIG. 1) slips downward on the first to the third slanted surfaces S1 to S3 while the descending acceleration thereof gradually decreases, and thereafter glides upward on the fourth and the fifth slanted surfaces S4 and S5, and thereby the speed thereof is reduced smoothly. After that, as shown by the arrow in broken line in FIG. 4, the article M on top of the fourth and fifth slanted surfaces S4 and S5 slide down slightly in the revered opposite direction and stops, and is held in the interior of the first collecting space A1.

In this manner, since the first collecting space A1 of the pool hopper 4 in which articles M glide down is formed continuously in roughly a U-shape, for example, when articles that are comparatively heavy and can chip away or break easily, such as ravioli, spring rolls, and other such frozen food, and the like are provided, since the moving speed of articles inside the pool hopper 4 gradually decreases and stops, it is possible to reduce damages of the articles.

Operation of Pool Hopper 4

If the first and second gates G1 and G2 start to open as shown in FIG. 5 from the closed state shown in FIG. 4, articles M on top of the second gate G2 are dropped onto the first gate G1, and along with this, articles M on top of the first gate G1 glide down on the slanted surface of the protrusion G1a, and is dropped onto a side wall surface S6 of the weighing hopper 6. After that, the first and the second gates G1 and G2 each opens until they are in a completely opened state shown in FIG. 6, and the articles M are discharged from the pool hopper 4 to the weighing hopper 6.

After the articles M are discharged, the first and the second gates G1 and G2 turn in the opposite direction, and returns to the closed state in FIG. 3, in preparation for a supply of new articles from the supply trough 3.

In this manner, since articles in the interior of the first collecting space A1 of the pool hopper 4 are dropped from the slanted surface of the protrusion G1a of the first gate G1 to the weighing hopper 6, the slanted surface of the protrusion G1a serves as a slide so as to reduce the freely falling distance of the articles M, and so the force of impact on the articles when they are dropped is small and it is possible to reduce damages of the articles. In addition, in order to drop the articles on the second gate G2 onto the first gate G1, it is preferable to set the link mechanism so that the second gate G2 opens up earlier than the first gate G1.

Furthermore, by opening both the first and the second gates G1 and G2, since the discharging time of the articles is faster, the time of a cycle also does not become too long (which does not lower the processing ability much).

Here, as shown in FIG. 6, the rotational angle θa of the first gate G1 is greater than the rotational angle θb of the second gate G2. In this manner, by greatly rotating the first gate G1 on which articles M slip down lastly, the articles M can be reliably discharged, and also, despite that the third slanting angle θ3 of the third slanted surface S3 is small, even comparatively large articles M can be reliably discharged without being remained on the first gate G1.

Weighing Hopper 6

Figure 9:
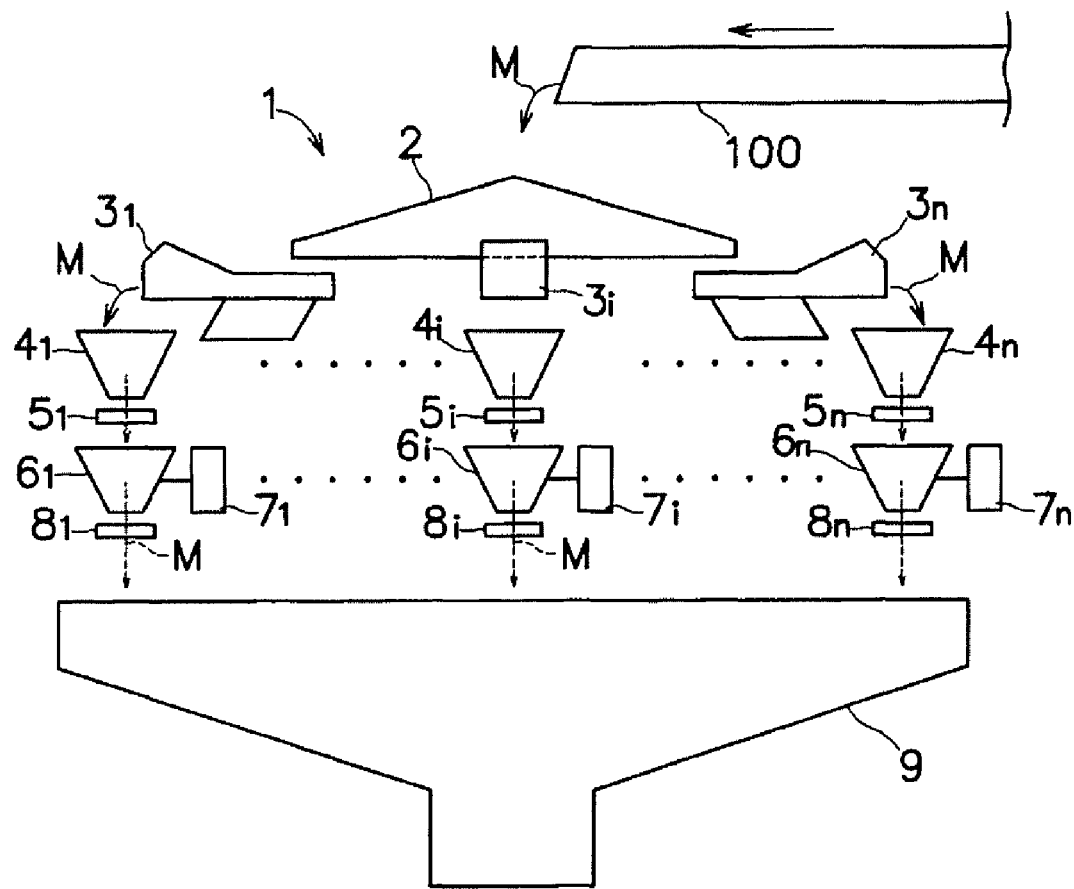
FIG. 9 is a schematic side view showing a pattern diagram for explaining a weighing system of a conventional combination weighing apparatus.

As shown in FIG. 2, the weighing hopper 6 includes a second hopper main body 60, a third gate G3, and a fourth gate G4. The second hopper main body 60 is supported by a weight detector 7i (refer to FIG. 9) arranged on the main body of the combination weighing apparatus 1 through a second fixation portion 60a and a second bracket 20. As shown in FIGS. 2 and 3, the second hopper main body 60 has a tubular shape.

The weighing hopper 6 temporarily holds the articles by closing both the third and the fourth gates G3 and G4. The weighing hopper 6 is a bi-parting hopper for discharging the articles by turning both the third and fourth gate G3 and G4 open.

Third and Fourth Gates G3, G4

The third gate G3 and fourth gate G4 are driven to open and close by a different driving device not shown, through a link mechanism, which is described below, same as the above described pool hopper 4.

Opening-Closing Mechanism of Third Gate G3

A second driving arm 21 driven by another driving device to turn with a second driving center M2 as the center thereof is provided on the main body of the combination weighing apparatus 1. A slide groove 21a is formed on an end portion of the second driving arm 21, and a slider 22a formed on an end portion of a third link 22 is provided slidably in the slide groove 21a. The third link 22 is arranged capable to turn with a third pivot point P3 as the center thereof, and the upper end portion of the third gate G3 is fixed to the third link 22.

Figure 7:
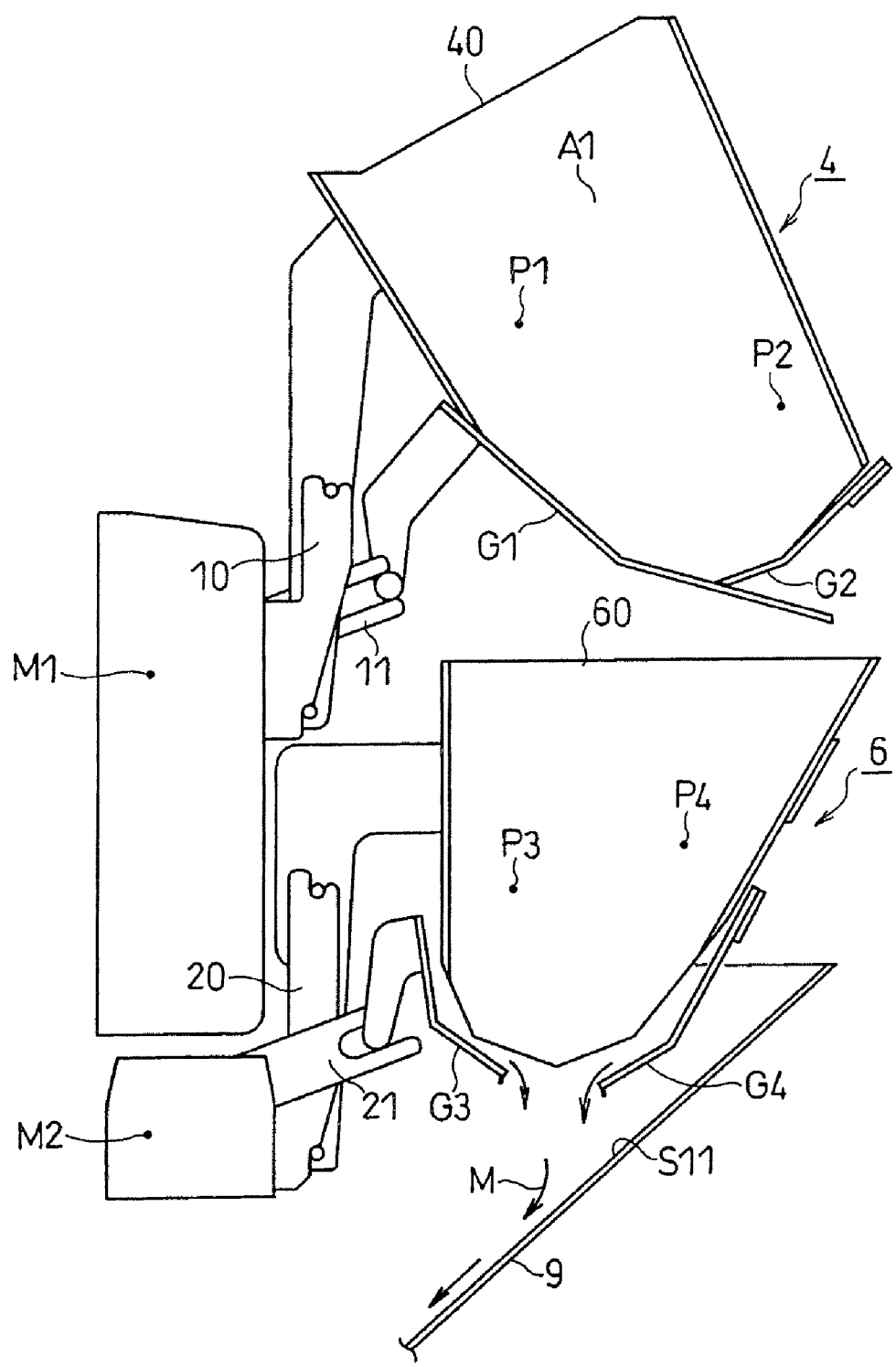
FIG. 7 is a schematic sectional view showing the operation of the weighing hopper.
Figure 8:
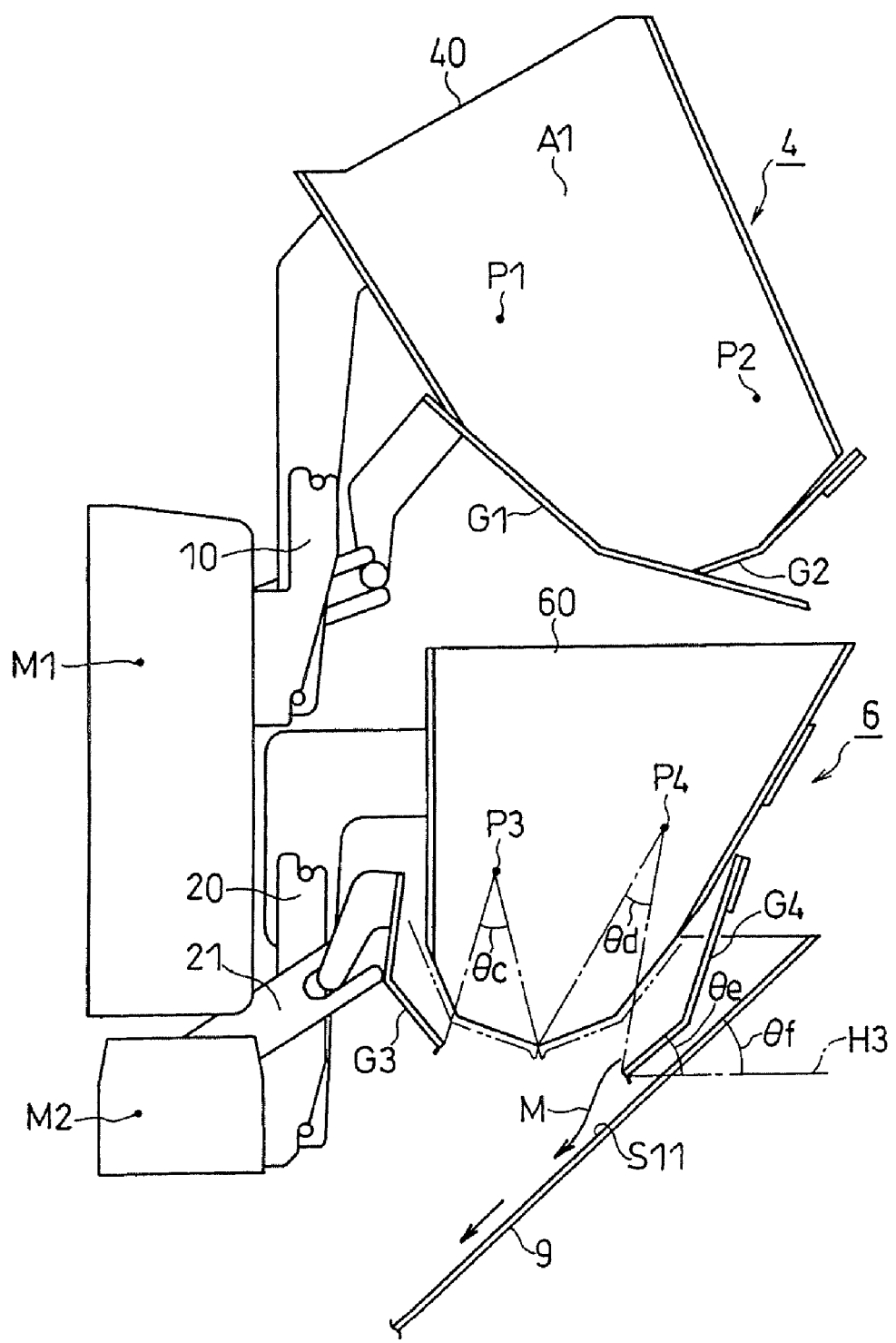
FIG. 8 is a schematic sectional view showing the operation of the weighing hopper.

If the second driving arm 21 turns in the arrow D3 direction with the second driving center M2 as the center thereof, from the closed state in FIG. 2, the third link 22 turns in the arrow D5 direction with the third pivot point P3 as the center thereof, and the third gate G3 fixed to the third link 22 opens as shown in FIGS. 7 and 8.

Opening-Closing Mechanism of Fourth Gate G4

An end portion of the fourth link 24 is connected to the other end portion of the third link 22 as shown in FIG. 2 through a second connecting link 23. The fourth link 24 is arranged capable of turning with a fourth pivot point P4 as the center thereof, and the fourth gate G4 is fixed to the other end of the fourth link 24.

Therefore, if the third link 22 turns with the third pivot point P3 as the center thereof, from the closed state shown in FIG. 2, the third gate G3 opens, and also, through the second connecting link 23, the fourth link 24 turns in the arrow D6 direction with the fourth pivot point P4 as the center thereof, and the fourth gate G4 opens as shown in FIGS. 7 and 8.

In the completely opened state shown in FIG. 8, the above described link mechanism is set so that a slanting angle θe of the fourth gate G4 formed with a horizontal plane H3, and a slanting angle θf the connecting chute 9 formed with the horizontal plane H3 are approximately the same.

Second Collecting Space A2 (FIG. 3)

In the completely closed state in FIG. 3, a second collecting space A2 for holding articles is formed in the interior of the weighing hopper 6. The third gate G3 and the fourth gate G4 include third and fourth inner surfaces 63 and 64 that face the second collecting space A2.

The angle that a sixth slanted surface (side wall surface) S6 for receiving articles M from the side of the protrusion G1a of the first gate G1 of the second hopper main body 60 forms with a horizontal plane H2 is set to be a sixth slanting angle θ6.

The fourth inner surface 64 is formed to be bent, and the fourth inner surface 64 of the fourth gate G4 is formed so that an eighth slanting angle θ8 that is formed by an eighth slanted surface S8 (fourth lower slanted surface) including a lower end portion G4d and the horizontal plane H2 is smaller than a seventh slanting angle θ7 formed by a seventh slanted surface S7 (fourth upper slanted surface) that includes an upper end portion G4u and the horizontal plane H2. Meanwhile, the seventh slanting angle θ7 is set to be smaller than the sixth slanting angle θ6.

Therefore, the sixth slanted surface S6, seventh slanted surface S7, and the eighth slanted surface S8 that face the second collecting space A2 on the side of the fourth gate G4 are set so that the slanting angles θ6, θ7, and θ8, in this order become smaller relative to the horizontal plane H2.

Meanwhile, the third inner surface 63 is formed to be bent, and the third inner surface 63 of the third gate G3 is formed so that a tenth slanting angle θ10 that is formed by a tenth slanted surface S10 (third upper slanted surface) including an upper end portion G3u and the horizontal plane H2 is larger than a ninth slanting angle θ9 that is formed by a ninth slanted surface S9 (third lower slanted surface) including a lower end portion G3d and the horizontal plane H2.

Therefore, the weighing hopper 6 is formed to be roughly in a U-shape by the sixth slanted surface S6, fourth inner surface 64, and the third inner surface 63 of the second hopper main body 60.

Movement Of Articles Within Weighing Hopper 6

As shown by the arrows in FIG. 5, the articles M discharged from along the slanted surface of the protrusion G1a of the first gate G1 of the pool hopper 4 are dropped on the sixth slanted surface S6 of the weighing hopper 6, and glide down on the sixth slanted surface S6. Since the inner surface of the second collecting space A2 is formed to be approximately in a U-shape, the articles M that glided down the sixth slanted surface S6 glide down the seventh and the eighth slanted surfaces S7 and S8, and thereby the acceleration thereof gradually decreases. Furthermore, the articles M glide upward on the ninth and the tenth slanted surfaces S9 and S10, and so the speed thereof is reduced smoothly. After that, as shown by the arrow in a broken line in FIG. 5, the articles M on the ninth and tenth slanted surfaces S9 and S10 slightly glide down in the revered opposite direction and stop, and the articles M are held in the interior of the second collecting space A2.

Operation of Weighing Hopper 6

A combined weight is obtained with the same method as that of a common combination weighing apparatus described above with reference to FIG. 9.

In other words, the weight of articles M held in a weighing hopper 6 is weighed by the weight detector 7i (refer to FIG. 9), to participate in a combining of weighed values with the weighed values of the articles that are held in the other weighing hoppers 6. Each of the weighed values is being combined with the others, so as to calculate a combined weighed value that is either on or near a target value. In the case that a weighing hopper 6 is being selected as a weighing hopper 6 that the weighed value thereof is to be combined with the others, the articles M therein are discharged from the weighing hopper 6 in a manner that is described below.

If the third and fourth gates G3 and G4 start to open as shown in FIG. 7 from the closed state shown in FIG. 6, as shown by the arrows, articles M on the third and fourth gates G3 and G4 start to drop onto an eleventh slanted surface S11 that is formed by the side wall surface of the collecting chute 9. The third and fourth gates G3 and G4 open up to a completely opened state shown in FIG. 8, and the articles M dropped on the eleventh slanted surface S11 of the collecting chute 9 are being discharged and collected at a device on the downstream side.

After being fully opened, the third and fourth gates G3 and G4 turn in the opposite direction and are returned to the closed state shown in FIG. 3, to prepare for the discharge of new articles from the pool hopper 4.

Here, as described above, when the third and the fourth gates G3 and G4 are in the completely opened state, since the slanting angle θe of the fourth gate G4 and the slanting angle θf the collecting chute 9 in FIG. 8 are set to be approximately the same, the fourth gate G4 comes near the eleventh slanted surface S11 of the collecting chute 9 and articles M glide down smoothly, and thereby damage to the articles can be suppressed.

In addition, by opening both the third and the fourth gates G3 and G4, since it is possible to reduce the lengths of the third and the fourth gates G3 and G4, the articles M can be discharged quickly.

Furthermore, as shown in FIG. 8, the rotational angle θc of the third gate G3 is set to be greater than the rotational angle θd of the fourth gate G4. For this reason, the fourth gate G4 does not come into contact with the collecting chute 9, and since the dimension of the opening of the third and fourth gates G3 and G4 can be made to be large, the articles M in the interior of the weighing hopper 6 can be discharged quickly and reliably, and also, it is possible to weigh comparatively large articles M.

Moreover, by combining the pool hopper 4 and the weighing hopper 6 one above the other, since it is possible to shorten as much as possible the freely falling distance of the articles, impact on the articles is reduced and damage to the articles can be suppressed.

In addition, the opening and closing movements of the first and second gates G1 and G2 of the pool hopper 4 and the third and fourth gates G3 and G4 of the weighing hopper 6 described above are controlled by a control unit that is not shown. The control unit sends out opening-closing instructions at predetermined timings to a driving device for driving each of the gates G1, G2, G3, and G4. In addition, the control unit also controls movements of the distribution portion 2 and the supply troughs 3, and performs the combination calculation process.

Figure 10:
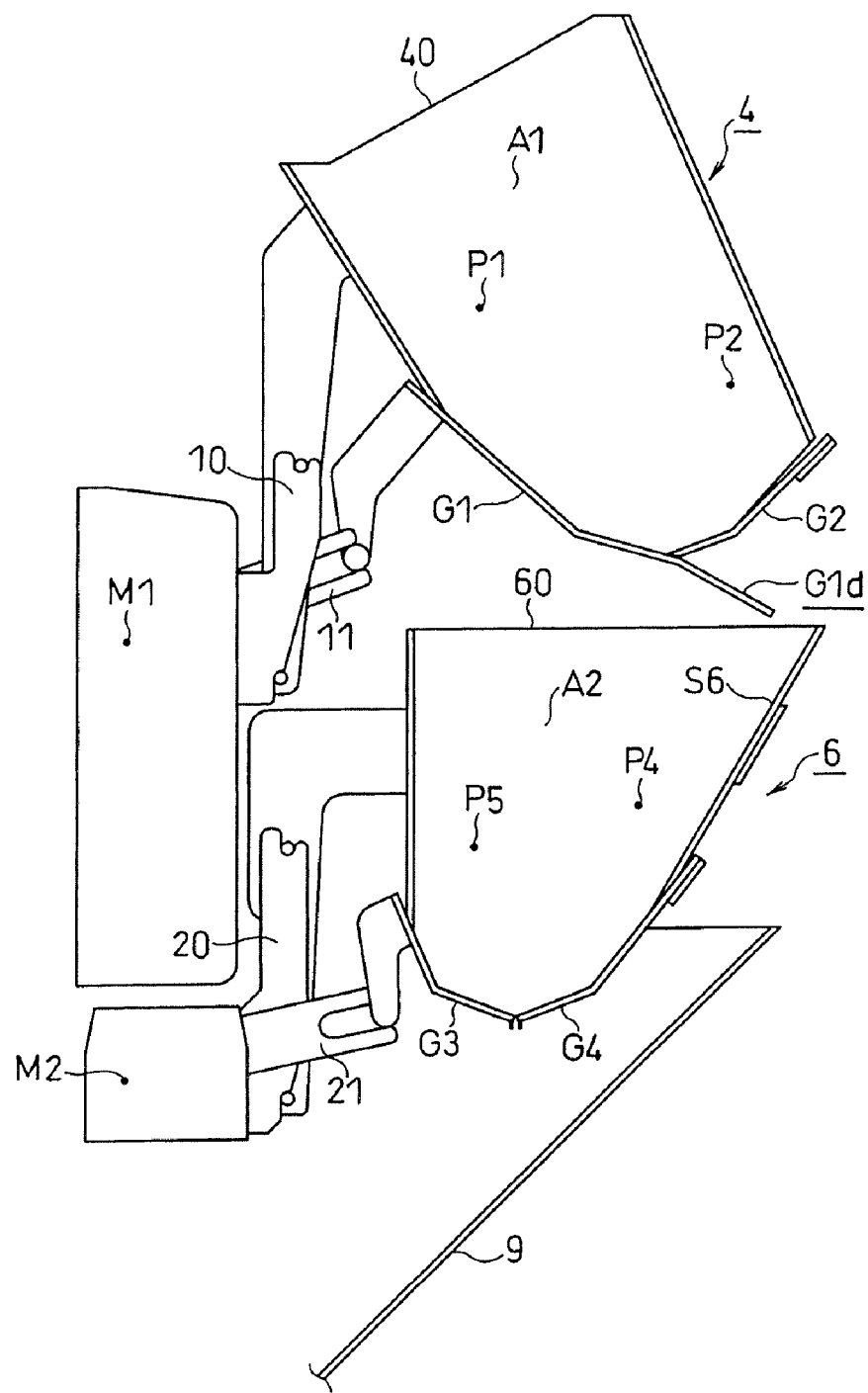
FIG. 10 is a schematic sectional view showing a modification example (1).

MODIFICATION EXAMPLES (1) As shown in FIG. 10, the lower end portion G1d of the first gate G1 may be arranged to bend toward the lower side.

(2) The inner surfaces of each of the gates G1 to G4 may be an arcuate shape that curves along a smooth curving line.

(3) The second gate G2 does not necessarily have to be bent or formed to be curved.

(4) The third gate G3 may be made to be long and the fourth gate G4 may be set to be short.

(5) The hoppers or the hopper unit does not necessarily have to be aligned in a circle, and may be provided in a combination weighing apparatus aligned linearly, for instance.

(6) In the above described embodiment, a combination weighing apparatus including the pool hopper 4 and the weighing hopper 6 was described. However, for example, it is also possible to adopt the present invention to a weighing apparatus without pool hoppers provided thereon, or an apparatus including a pool hopper, weighing hopper, and booster hopper.

(7) In the combination weighing apparatus according to the above described embodiment, even though pool hoppers 4 having two gates G1 and G2 are adopted, it is also possible to adopt pool hoppers and weighing hoppers having only one gate. Here, a case of adopting a pool hopper having only 1 gate will be described referring to FIGS. 11 and 12.

Figure 11:
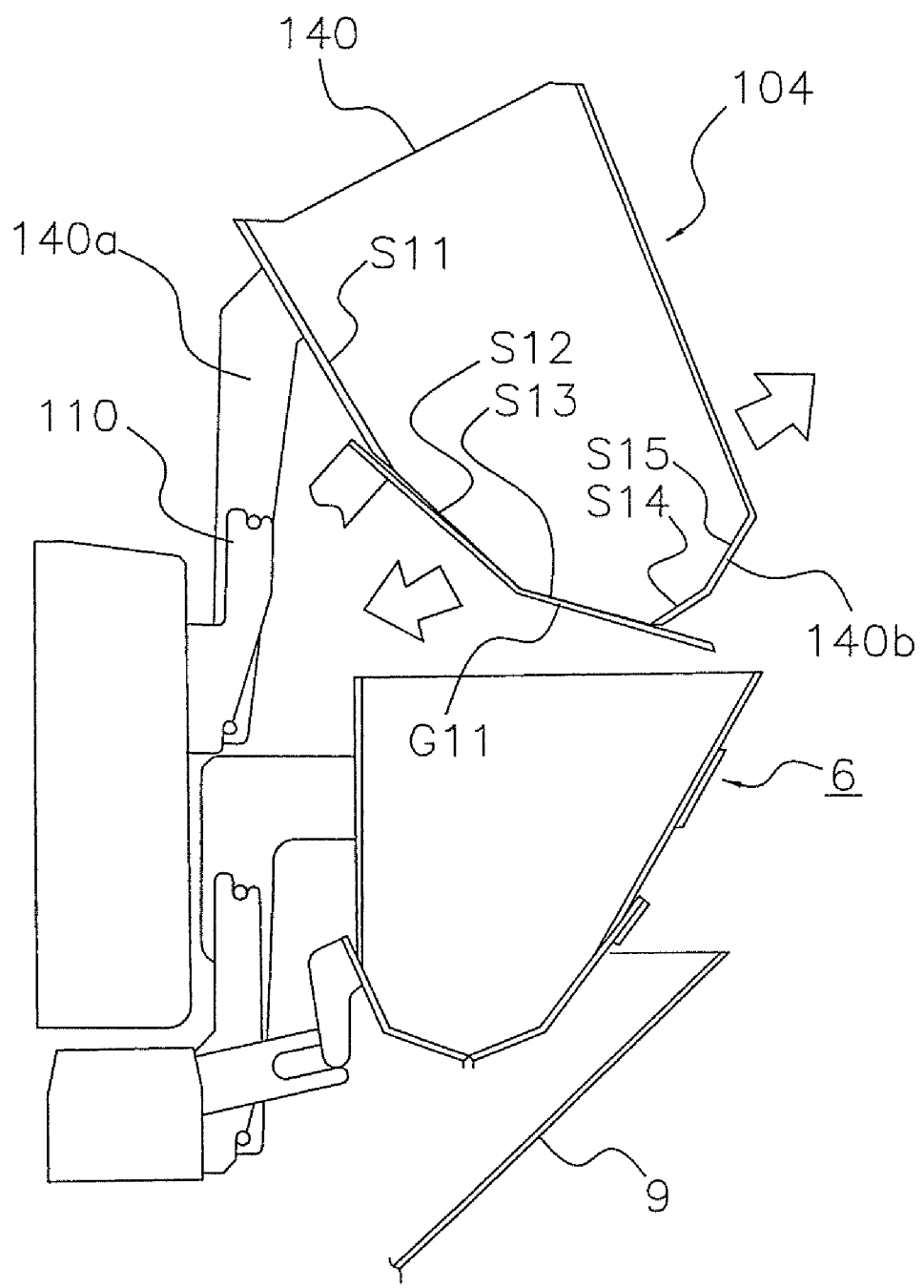
FIG. 11 is a schematic sectional view showing the operation of a pool hopper of a modification example (7).

With this hopper unit, a pool hopper 104 shown in FIG. 11 is adopted instead of the above described pool hopper 4. The pool hopper 104 has a hopper main body 140 and a gate G11. The hopper main body 140 is supported on the main body of a combination weighing apparatus through a fixation portion 140a and a bracket 110. The hopper main body 140, fixation portion 140a, and bracket 110 turn (refer to FIGS. 11 and 12) for only a very tiny angle relative to the main body of the combination weighing apparatus, through a driving device that is not shown. In addition, the pool hopper 104 temporarily holds articles by having the gate G11 closed, and discharges articles by having the Gate G11 turn to open.

The gate G11 is driven to open and close by a driving device not shown, through a link mechanism, same as the above described first gate G1. The opening-closing mechanism of the Gate G11 is the same as the opening-closing mechanism of the first gate G1, and for this reason, description thereof is omitted.

In the closed state shown in FIG. 11, a collecting space for holding the articles is formed in the interior of the pool hopper 104. The gate G11 has an inner surface that faces the collecting space. This inner surface includes a twelfth slanted surface S12 including an upper end portion, and a thirteenth slanted surface S13 including a lower end portion. On the other hand, a slanted portion 140b is formed on the bottom of the hopper main body 140. The inner surface of this slanted portion 140b includes a fourteenth slanted surface S14 on the lower side and a fifteenth slanted surface S15 on the upper side. In addition, an eleventh slanted surface S11 is formed on the side of the supply trough 3 (refer to FIG. 1) of the hopper main body 140.

In the closed state shown in FIG. 11, the angle formed by the thirteenth slanted surface S13 of the gate G11 with the horizontal plane is smaller than the angle formed by the twelfth slanted surface S12 with the horizontal plane. Furthermore, the angle that the fourteenth slanted surface S14 of the hopper main body 140, which the bottom end thereof is in contact with the thirteenth slanted surface S13 of the gate G11 when in the closed state shown in FIG. 11, forms with the horizontal plane is smaller than the angle that the fifteenth slanted surface S15 forms with the horizontal plane.

Therefore, the slanting angles relative to the horizontal plane of the eleventh slanted surface S11, twelfth slanted surface S12, and thirteenth slanted surface S13 that face the collecting space, in this order, are set to gradually become smaller. Furthermore, the slanting angles relative to the horizontal plane of the fourteenth slanted surface S14 and the fifteenth slanted surface S15 of the hopper main body 140 are set to become bigger in this order.

When being collected, the articles provided and dropped from the supply trough 3 (refer to FIG. 1) glide downwardly on the eleventh to thirteenth slanted surfaces S11 to S13 while the falling acceleration thereof gradually decreases, and thereafter the articles glide upward on the fourteenth and fifteenth slanted surfaces S14 and S15, and thereby the speed thereof is reduced smoothly. After that, the articles on the fourteenth and fifteenth slanted surface S14 and S15 slightly glide down in the reversed opposite direction and stop, and the articles are held in the interior of the collecting space of the pool hopper 104.

Figure 12:
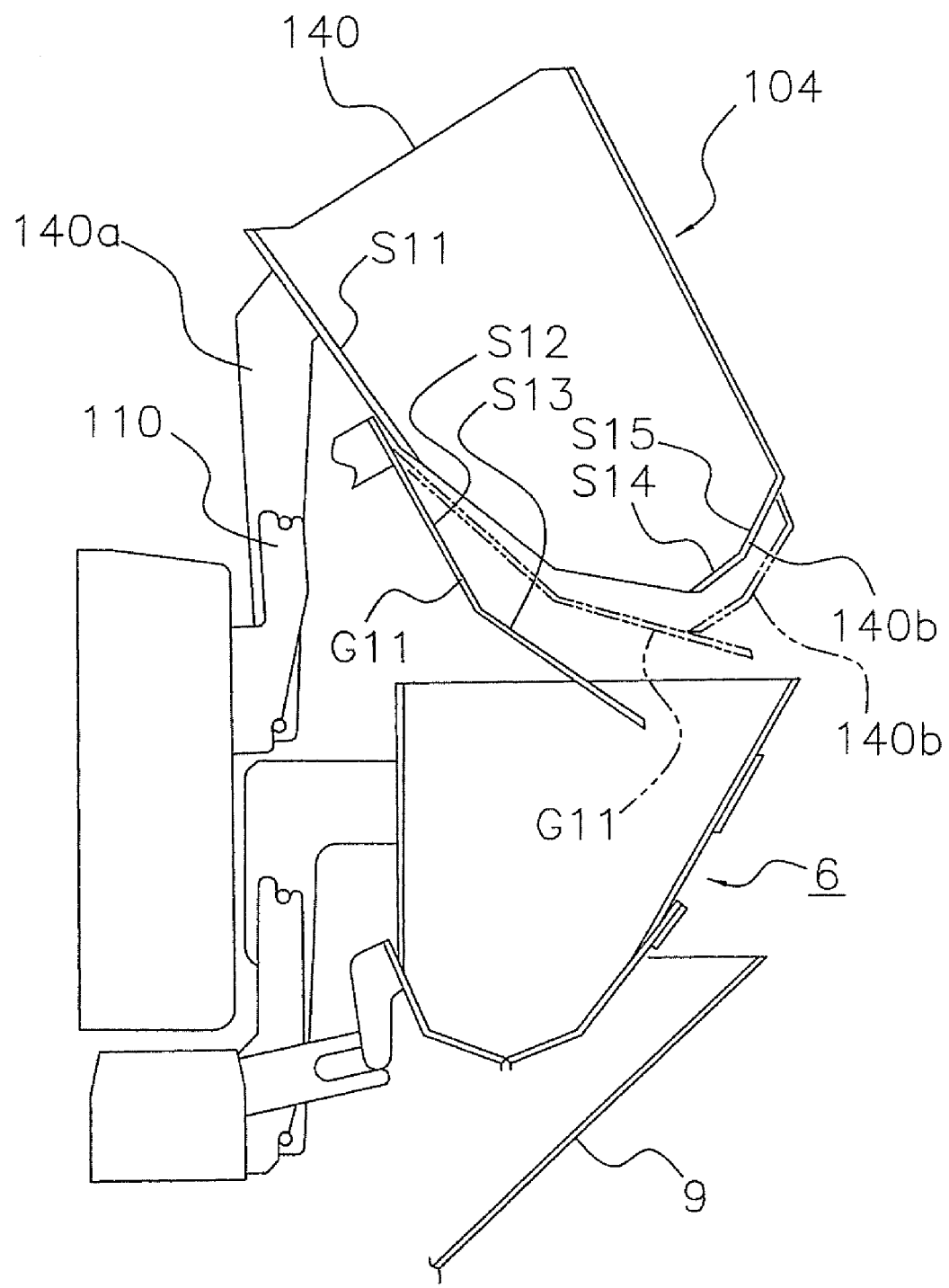
FIG. 12 is a schematic sectional view showing the operation of the pool hopper of the modification example (7).

In addition, if the gate G11 opens up as shown in FIG. 12 from the closed state shown in FIG. 11, the articles being supported on the fourteenth slanted surface S14 and the fifteenth slanted surface S15 of the hopper main body 140 drop onto the gate G11. Furthermore, articles on the gate G11 drops down to the weighing hopper 6. At this time, the hopper main body 140 of the pool hopper 104 turns outward only for a very tiny angle relative to the main body of the combination weighing apparatus. As a result, the gate G11 and the slanted portion 140b of the hopper main body 140 that were in the positions shown by the two-dot chain lines in FIG. 12 move to separate from each other (refer to the outlined arrows in FIG. 11), and the discharge of the articles is accelerated.

The effect of the embodiments described above can be obtained even with the case of adopting a weighing hopper or a pool hopper 104 having only one of this kind of a gate G11.

The invention claimed is:

1. A hopper adapted to be used in a weighing apparatus, the hopper comprising:
a first hopper main body having a tubular shape, and configured and arranged to be mounted to the weighing apparatus, the first hopper main body having a discharge opening;
a first gate operatively coupled to the first hopper main body, the first gate having a first inner surface forming a collecting space with the first hopper main body so as to hold articles, and the first gate being configured and arranged to be selectively open and close to store the articles when in a closed state and to discharge the articles when in an opened state, the first inner surface of the first gate including a first upper slanted surface and a first lower slanted surface that are continuous, with an angle formed by the first lower slanted surface and the horizontal plane being smaller than an angle formed by the first upper slanted surface and the horizontal plane when the first hopper main body is mounted to the weighing apparatus, and
a second gate operatively coupled to the first hopper main body, the second gate having a second inner surface forming the collecting space with the first hopper main body and the first inner surface, the first gate and the second gate being asymmetrically arranged relative to the discharge opening such that in the closed state the first gate covers a larger area of the discharge opening than the second gate, the second inner surface of the second gate including a second upper slanted surface and a second lower slanted surface that are continuous, with an angle formed by the second lower slanted surface and the horizontal plane being smaller than an angle formed by the second upper slanted surface and the horizontal plane when the first hopper main body is mounted to the weighing apparatus.

2. The hopper according to claim 1, further comprising
the second gate being configured and arranged to selectively open and close so that the second gate is in a closed state when the first gate is in the closed state so as to store the articles and the second gate is in an opened state when the first gate is in the opened state so as to discharge the articles,
the second inner surface of the second gate being slanted relative to a vertical plane when the first hopper main body is mounted to the weighing apparatus, and
the first and second gates being arranged so that the articles glided downwardly on the first inner surface of the first gate glide upward, inclining upward along the second inner surface of the second gate.

3. The hopper according to claim 2, wherein
the first inner surface is longer than the second inner surface when viewed from a direction along pivot axes of the first gate and the second gate, and
when the first gate and the second gate are in the closed state, a lower end of the second gate is in contact with or disposed adjacent to the first inner surface.

4. The hopper according to claim 2, wherein
a rotational angle of the first gate when the first gate opens is greater than a rotational angle of the second gate when the second gate opens.

5. The hopper according to claim 1, wherein
the first hopper main body has a slanted surface on the bottom portion thereof on which the articles glided downwardly on the first inner surface glide inclining upward.

6. The hopper according to claim 1, wherein
the first hopper main body is configured and arranged to also turn when the first gate turns to open to accelerate the discharge of the articles.

7. A hopper unit adapted to be used in a weighing apparatus, the hopper unit comprising:
a hopper, which is the hopper according to claim 1; and
a second hopper positioned below the first hopper,
the second hopper including
a second hopper main body having a tubular shape, and configured and arranged to be mounted to the weighing apparatus,
a third gate operatively coupled to the second hopper main body, the third gate having a third inner surface, and
a fourth gate operatively coupled to the second hopper main body, the fourth gate having a fourth inner surface,
the second hopper being configured and arranged to discharge the articles with respect to the second hopper main body by opening the third gate and the fourth gate, the first and second hoppers being arranged so that the articles discharged and dropped from the first hopper hit an inner surface of the second hopper main body, the third inner surface of the third gate including a third upper slanted surface and a third lower slanted surface that are continuous, with an angle formed by the third lower slanted surface and the horizontal plane being smaller than an angle formed by the third upper slanted surface and the horizontal plane when the second hopper main body is mounted to the weighing apparatus, the fourth inner surface of the fourth gate including a fourth upper slanted surface and a fourth lower slanted surface that are continuous, with an angle formed by the fourth lower slanted surface and the horizontal plane being smaller than an angle formed by the fourth upper slanted surface and the horizontal plane when the second hopper main body is mounted to the weighing apparatus.

8. A combination weighing apparatus comprising:

a plurality of hopper units according to claim 7; and a collecting chute having a funnel shape arranged below the hopper units to collect the articles discharged from the hopper units, a slanting angle of the fourth lower slanted surface of the fourth gate in the opened state relative to the horizontal plane and a slanting angle of the collecting chute relative to the horizontal plane being substantially the same when the second hopper main body is mounted to the combination weighing apparatus.

9. The hopper according to claim 1, wherein the first gate pivots about a first pivot axis and the second gate pivots about a second pivot axis, the first pivot axis being vertically above the second pivot axis.

10. The hopper according to claim 1, wherein the angle formed by the first lower slanted surface and the horizontal plane, and the angle formed by the second lower slanted surface and the horizontal plane are unequal with the first and second gates in the closed state.

11. The hopper according to claim 10, wherein the angle formed by the first upper slanted surface and the horizontal plane, and the angle formed by the second upper slanted surface and the horizontal plane are unequal with the first and second gates in the closed state.

12. The hopper according to claim 1, wherein the angle formed by the first lower slanted surface and the horizontal plane, being smaller than the angle formed by the second lower slanted surface and the horizontal plane with the first and second gates in the closed state.

13. The hopper according to claim 11, wherein the angle formed by the first upper slanted surface and the horizontal plane being smaller than the angle formed by the second upper slanted surface and the horizontal plane with the first and second gates in the closed state.

14. The hopper according to claim 1, wherein the first lower slanted surface extends under an entire horizontal length of the second lower slanted surface with the first and second gates in the closed state.

15. The hopper according to claim 1, further comprising a first link, a second link and a third link that are configured to selectively open and close the first and second gates, wherein the first gate is fixedly attached to the first link for movement therewith, the third link is fixedly attached to the second gate for movement therewith and the second link includes a first end pivotally connected to the first link and a second end pivotally connected to the third link such that the second link causes the third link to move in response to movement of the first link.

16. The hopper according to claim 15, wherein the first, second and third links are configured such that with the first and second gates in the open state, a rotational angle of the first gate is greater than a rotational angle of the second gate.

\* \* \* \* \*